(12) United States Patent
Gao et al.

(10) Patent No.: US 12,204,541 B2
(45) Date of Patent: Jan. 21, 2025

(54) PERFORMANCE OPTIMIZATIONS FOR SECURE OBJECTS EVALUATIONS

(71) Applicant: Snowflake Inc., Bozeman, MT (US)

(72) Inventors: Bicheng Gao, San Mateo, CA (US);
Nicola Dan Onose, San Jose, CA (US);
Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/172,688

(22) Filed: Feb. 22, 2023

(65) Prior Publication Data

US 2023/0350893 A1    Nov. 2, 2023

Related U.S. Application Data

(60) Provisional application No. 63/363,842, filed on Apr. 29, 2022.

(51) Int. Cl.
*G06F 16/2453* (2019.01)
*G06F 16/23* (2019.01)

(52) U.S. Cl.
CPC .... *G06F 16/24544* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 2005/0177570 A1* | 8/2005 | Dutta | G06F 21/6227 707/999.009 |
| 2017/0147644 A1* | 5/2017 | Lee | G06F 16/00 |
| 2020/0042737 A1* | 2/2020 | Lee | G06F 21/6218 |
| 2023/0169121 A1* | 6/2023 | Yuen | G06F 16/217 707/781 |

* cited by examiner

*Primary Examiner* — Irene Baker
(74) *Attorney, Agent, or Firm* — Schwegman Lundberg & Woessner, P.A.

(57) ABSTRACT

A source table can be provided by a provider account in a data system. A secure view of the source table is provided to one or more consumer accounts, the secure view limiting access to a subset of data in the source table. A plan to execute a command using the secure view may be generated, the plan including a secure view boundary on a subset of operations defining the secure view. The plan may be modified to move a first operation that was outside the secure view boundary to within the secure view boundary to generate a second plan to optimize performance in view of limitations or restrictions placed by the secure view.

24 Claims, 11 Drawing Sheets

PERFORMANCE OPTIMIZATIONS FOR SECURE OBJECTS EVALUATIONS

CROSS-REFERENCE TO RELATED APPLICATION

This application claims the benefit of priority to U.S. Provisional Patent Application Ser. No. 63/363,842 filed Apr. 29, 2022, the contents of which are incorporated herein by reference in its entirety.

TECHNICAL FIELD

The present disclosure generally relates to database objects, and in particular, secure view and function performance optimizations.

BACKGROUND

Network-based database systems may be provided through a cloud platform, which allows organizations and users to store, manage, and retrieve data from the cloud. With respect to type of data processing, a database system could implement online transactional processing, online analytical processing, a combination of the two, and/or another type of data processing. Moreover, a database system could be or include a relational database management system and/or one or more other types of database management systems.

One such example is a cloud data warehouse (also referred to as a "network-based data warehouse" or simply as a "data warehouse"), which is a network-based system used for data analysis and reporting that comprises a central repository of integrated data from one or more disparate sources. Data can be typically shared from one account to another using views. However, security can be an issue when using such views. The provider account may not want to grant a receiver account access to all data but only a subset of data.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
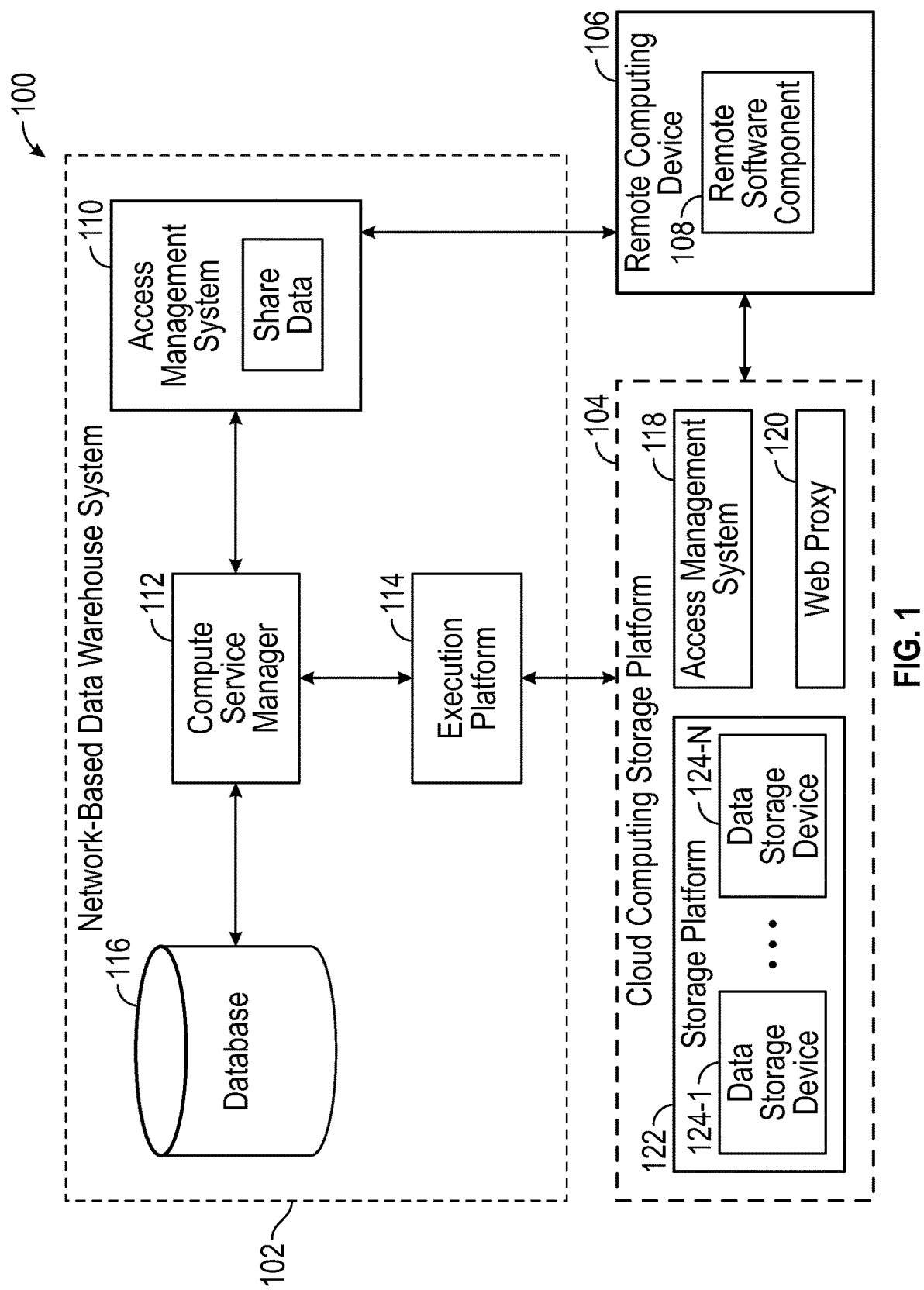
FIG. 1 illustrates an example computing environment in which a cloud database system, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views.

The network-based data warehouse system 102 comprises an access management system 110, a compute service manager 112, an execution platform (XP) 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
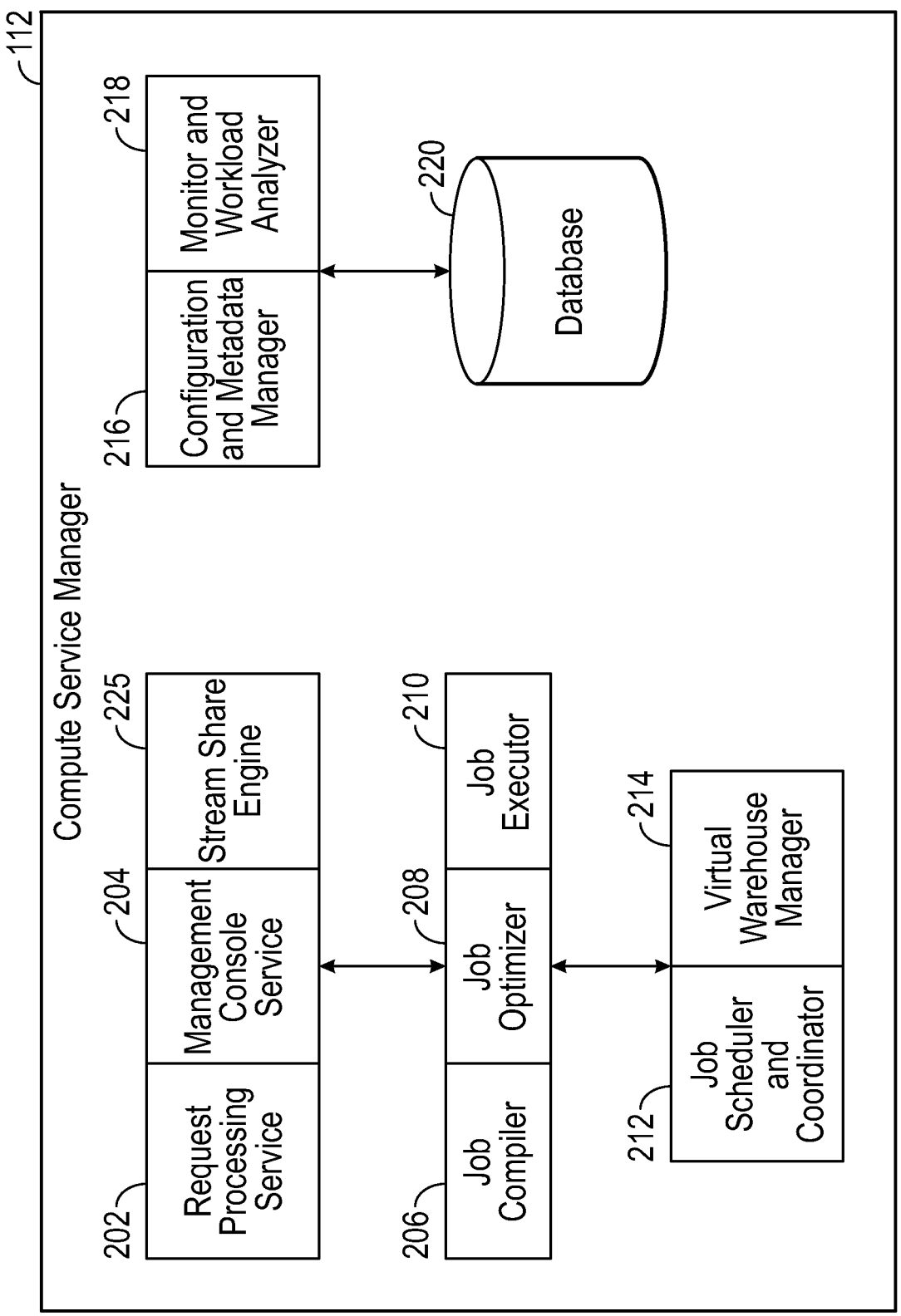
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represents any data storage device within the network-based data warehouse system 102. For example, data storage device 220 may represent caches in execution platform 114, storage devices in cloud computing storage platform 104, or any other storage device.

Figure 3:
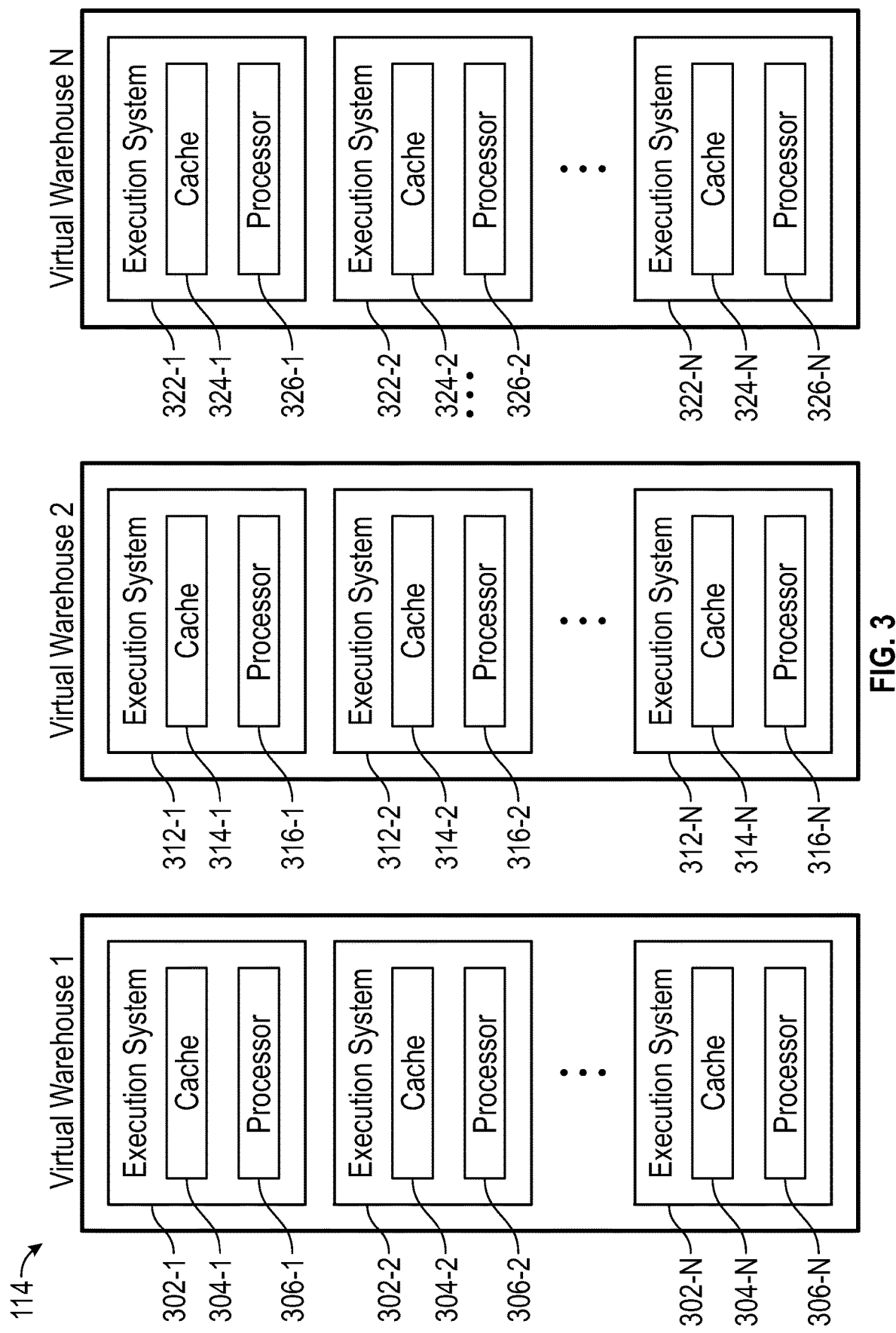
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As described above, a database system may have multiple accounts or clients that each store unique sets of data within the database system, also referred to as a multi-tenant database system. In an example implementation, the database system may store and manage data for multiple businesses and each of the multiple businesses may have one or more accounts within the database system. In some scenarios, it may be desirable to permit two or more different accounts to share data. Data may be shared between a provider account, which owns the data, and a receiver account, which can then have access to the shared data using secure objects.

Secure views may be used to share data across accounts while maintaining certain security and privacy restrictions. A view may be defined as a secure view when it is specifically designated for data privacy or to limit access to data that should not be exposed to all accounts of the underlying table. Data might be exposed in a secure view when, for example, an account has access to only a subset of data. Secure views permit a database account to expose a restricted data set to other accounts or users without the possibility of the underlying, unrestricted data being exposed to those other accounts or users. In some embodiments, a provider account can authorize cross-account access to its data to a receiver account. The provider account may limit the receiver account to viewing only certain data and may restrict the receiver account from viewing any underlying organization schema or statistics about the data.

In some embodiments, a secure view provides several security protocols when compared against a regular view. In some embodiments, the secure view does not expose the view definition to non-owners of the view. This impacts various operations that access the data dictionary. In some embodiments, the secure view does not expose information about any underlying data of the view, including the amount of data processed by the view, the tables accessed by the view, and so forth. This impacts the statistics that are displayed about the number of bytes and partitions scanned in a query, and what is displayed in the query profile for a query referring to a secure view. In some embodiments, the secure view does not expose data from tables accessed by the view which is filtered out by the view. In such embodiments, a client account associated with a non-secure view may access data that would be filtered out by taking advantage of query optimizations that may cause user expressions to be evaluated before security expressions (e.g., filters and joins). In such embodiments, to achieve this security objective, the set of query optimizations that can be applied to a query containing a secure view may be restricted so that the user expressions that can leak data are not evaluated before the view is filtered.

In some embodiments, a secure view component may define the secure view using a SECURE keyword in a view field and may set or unset the SECURE property on a view using an ALTER VIEW command. The secure view component may implement such commands at the manual direction of a client account or may be configured to automatically implement such commands. The secure view component may alter the parser to support the secure keyword before the view name and the new alter view rule. In some embodiments, the alter view rule may be more general to incorporate further view-level attributes. In terms of metadata support, the views may effectively be stored as tables, and the change may involve altering a table data persistence object that includes a secure flag indicating whether the view is a secure view (this may be implemented in addition to the view text comprising the secure tag). The secure view definition (i.e., the table data persistence object) may be hidden from users that are not the owner of the view. In such embodiments, a command to show views will return results as usual to the owner of the view but will not return the secure view definition to a non-owner second account that has access to the view.

The secure view component may alter transformations of a parse tree, e.g., view merging and predicate information. The canonical implementation may include annotating query blocks such that the query blocks are designated as coming from a secure view. In such an implementation, the query blocks cannot be combined with external query blocks (e.g., view merging) or expressions (e.g., via filter pushdown).

The secure view component may rewrite the query plan tree during optimization, e.g., during filter pullup and/or filter pushdown. The secure view component may be configured to ensure that no expression that does not stem from a secure view can be pushed down below the view boundaries. The secure view component may be configured to achieve this by implementing a new type of projection that behaves identically to a standard projection but, since it is not a standard projection, fails to match any of the rewrite rule preconditions. As a result, the relevant rewrites are not applied. The secure view component may be configured to identify what type of projection is to be generated (e.g., a standard projection or a secure projection) after query blocks have been designated as coming from a secure user-defined function definition or not. The secure view component may be configured to optimize performance for secure views in a zero-copy data sharing system.

As described above, secure objects, which can include secure views and secure functions, can be used to provide limited access to data. Secure views allow the owner of the data with multi-tenant table structures to securely provide access to specified relevant sections of each table with each other party using a single set of secure views and data shares. Secure functions (e.g., user-defined functions (UDFs)) provide the additional functionality to expose data in a parameterized way. For example, secure functions prevent the other party from seeing the underlying table structure, seeing the function logic, viewing or exporting the underlying data, and asking non-approved questions of the data (e.g., queries).

Sharing regular views directly could open the underlying data to unintended exploits, so the secure view implementation, as described herein, adopts mechanisms to prevent unauthorized data access. The view definition is hidden as well as access to underlying tables referenced from secure views. The system prevents parse tree transformations across secure view Queryblocks; for example, the system may restrict applying view merging optimizations for secure views. In the optimizer during QueryPlanNode Tree representation, the system adds additional Secure Projection nodes on top of the secure view boundaries. These Secure Projection nodes can effectively act as barriers for query optimizations and blocks rewrite rules across view boundaries.

In addition to sharing the same mechanism with secure views, secure functions (e.g., UDFs) can present another set of issues when it comes to security enforcement, which support both Scalar and Table secure UDFs. For secure UDFs, besides the Secure Projection that is added to the "Top" of the function (similar to secure views), another Secure Projection is also added to the left side of the Apply. This allows existing subquery unnesting rewrite rules to still apply, which leads to successful unnesting processes and avoids decorrelation failures.

As described above, providing these security mechanisms for secure views and section functions can affect performance, e.g., query execution. Next, techniques to optimize performance of secure views and functions while maintaining secure functionality are described. The techniques can be categorized as: A) modifications to rewrites, and B) dedicated performance optimizations for secure views/functions.

Figure 4:
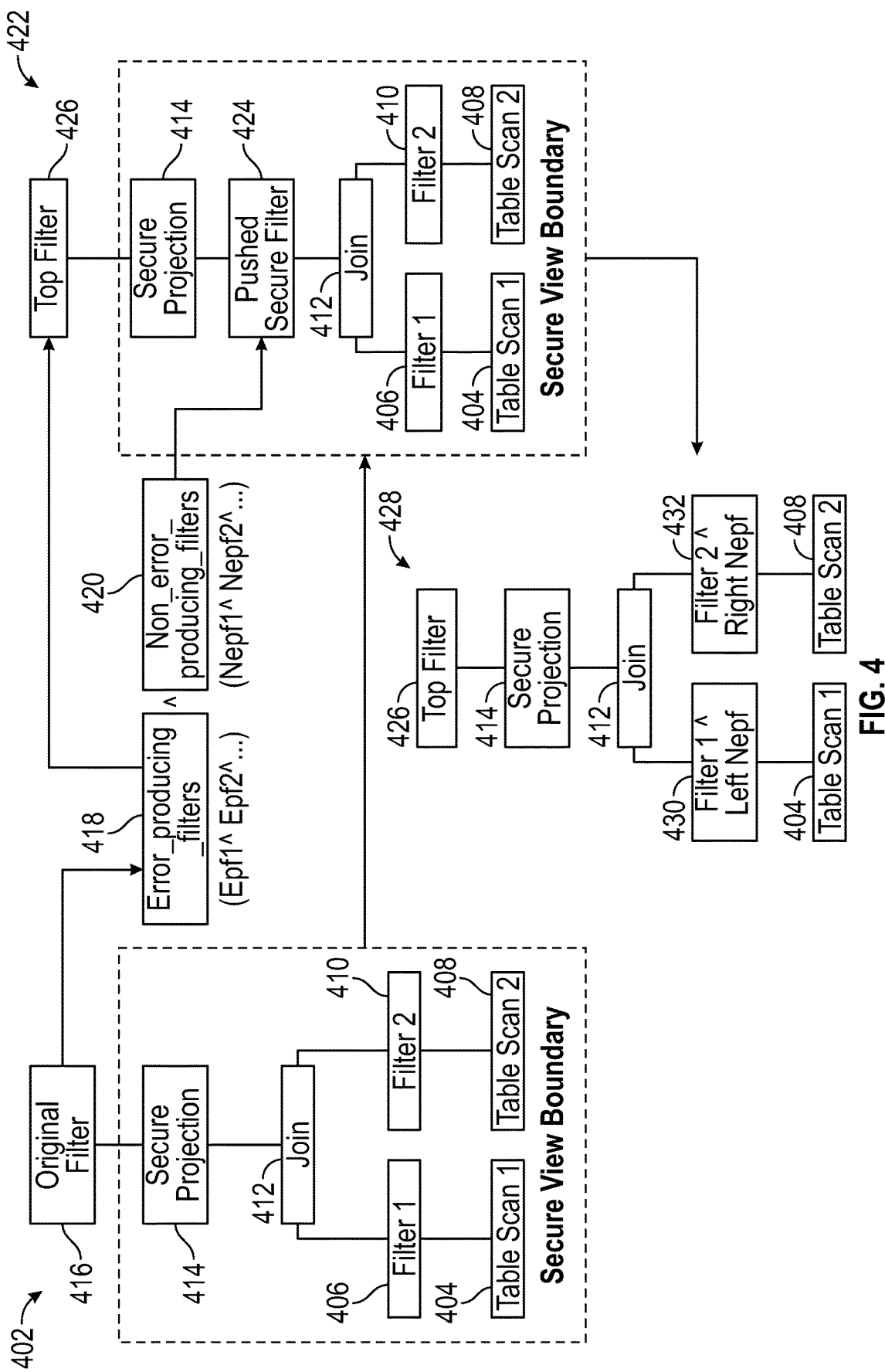
FIG. 4 illustrates a process for secure predicate pushdown, according to some embodiments.

A1a. Secure Predicate Pushdown. The secure-predicate-pushdown technique involves pushing down identified secure predicates. This approach eliminates the risks associated with secure view evaluation by reducing the scope and applicability of an existing optimization. This includes pushing non-error-producing predicates down through Secure Projections. FIG. 4 illustrates an example for secure predicate pushdown. As shown, error producing filters and non-error producing filters are identified. The non-error producing filters are pushed into a secure view boundary and then transformed for further optimization.

An original secure view plan 402 (e.g., parsetree representation) is shown with a secure view boundary. The components in plan 402 that are within the secure view boundary include a table scan 1 404, a filter 1 406, a table scan 2 408, a filter 2 410, a join 412, and a secure projection 414. An original filter 416 is included outside of the secure view boundary. The original filter 416 may be analyzed and the filter parameters in the original filter 416 may be separated into error producing filters (Epf1^, Epf2^, ...) 418 and non-error producing filters (Nepf1^, Nepf2^, ...) 420. Error producing filters 416 may be identified as filters that could produce additional errors even when the input data does not contain errors. Such errors could break security guarantees of secure views since malicious actors could reveal hidden information through generating queries that contain errors. An example of an error producing filter is a simple expression such as $1/(E-C)$, where E is an arbitrary expression and C is a constant value. When $E-C=0$, a Div-by-Zero error will be reached and a query involving the secure view might fail. If a predicate containing this error is pushed to the secure view, it might help reveal information about data the secure view is trying to hide. Specifically, the malicious user would be able to determine whether the secure view contains an expression within the target value.

A modified secure view plan 422 may be generated based on the identified error producing and non-error producing filters 418, 420. The modified secure view plan 422 may include the table scan 1 404, the filter 1 406, the table scan 2 408, the filter 2 410, the join 412, and the secure projection 414 within the secure view boundary. However, the modified secure view plan 422 may also include a new pushed secure filter 424, which includes the identified non-error producing filters 420, within the secure view boundary. The identified error producing filters 418 may remain outside of the secure view boundary in a top filter 426.

With the non-error producing filters 420 now being within the secure view boundary, further optimizations can be performed within the secure view boundary, such as pushing the non-error producing filters (Nepf1ˆ, Nepf2ˆ, . . . ) further down. A final secure view plan 428 may be generated based on the further transformations. The final secure view plan 428 may push the non-error producing filters (Nepf1ˆ, Nepf2ˆ, . . . ) down the left and right filters of the table scan branches. Thus, the final secure view plan 428 may include the table scan 1 404 with a modified filter 1 430 with identified non-error producing filters associated with table scan 1 404 (left), and may include the table scan 2 408 with a modified filter 2 432 with identified non-error producing filters associated with table scan 2 408 (right). The final secure view plan 428 may also include the join 412 and the secure projection 414 within the secure view boundary, and may include the top filter 424 with the identified error producing filters (Epf1ˆ, Epf2ˆ, . . . ).

A1b. Pruning Pushdown through Secure View Query Blocks. This pruning pushdown technique involves pushing down pruning aspects through secure view query blocks. This approach reduces scope of what is pushed down. Multiple rounds of pruning are typically applied on the ParseTree representation. For pruning operations, the system may prune out partitions that are guaranteed to not pass the top filter, where protection error producing partitions will remain. Thus, the system may consider it safe to push down identified predicates for pruning purposes during this compilation phase.

This approach involves decoupling of predicates used for pruning with pushing down of predicates that will be evaluated during execution, where the original predicate to be evaluated in XP (execution platform) still remains above the Secure View boundary. This can be implemented by marking pushed down predicates with additional information on whether they should be treated as pruning only predicates. Also, additional treatments may be used to remove these pruning only predicates afterwards, as well as making sure no duplicate predicates are generated due to the remaining predicate on top.

Figure 5:
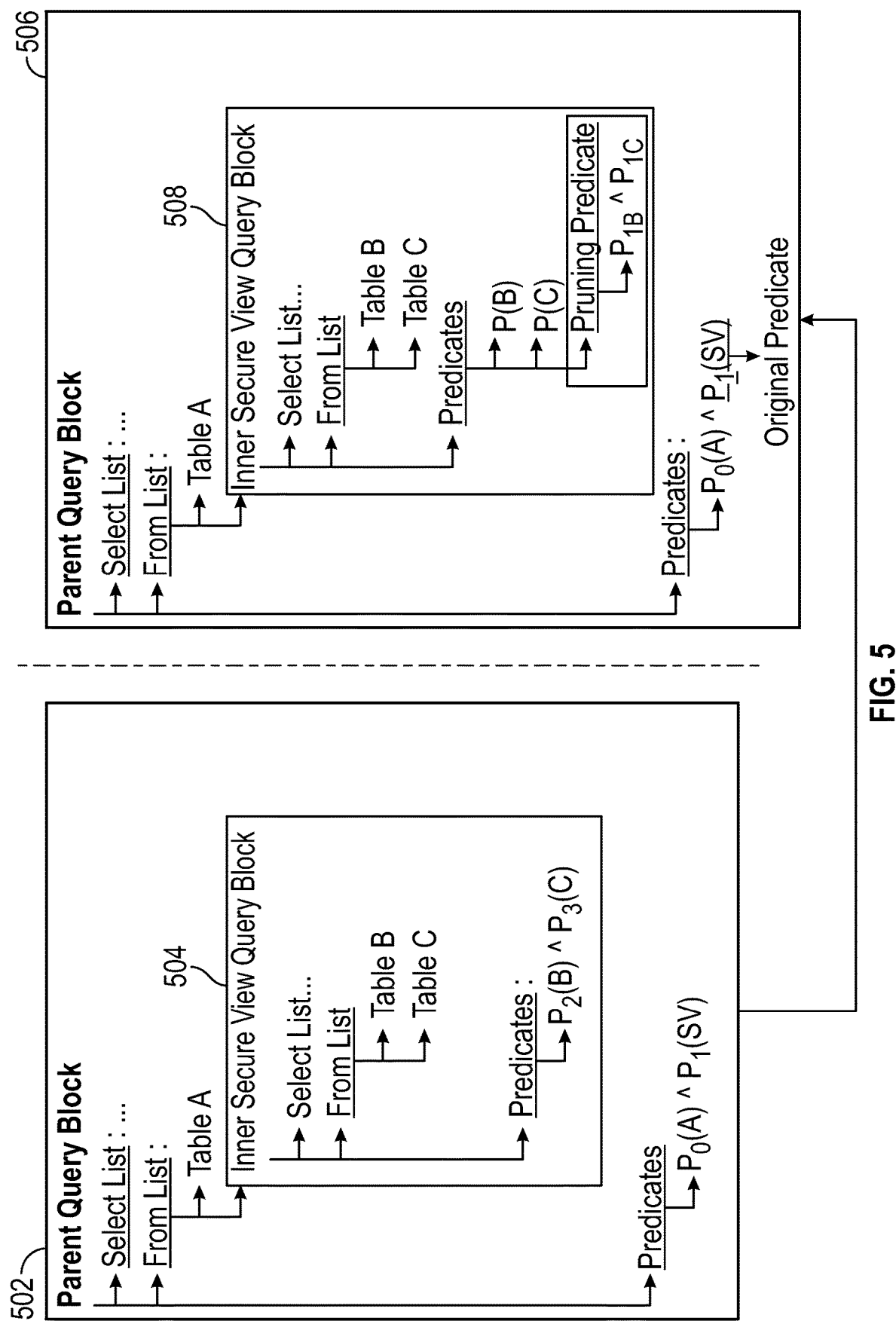
FIG. 5 illustrates a process for pruning predicate pushdown through secure view query blocks, according to some embodiments.

FIG. 5 illustrates an example of pruning pushdown through secure view query blocks. An original parent query block 502 is shown. The original parent query block 502 includes a Table A and an inner secure view (SV) query block 504. The inner SV query block 504 includes a Table B and Table C as well as predicates P2(B)ˆP3(C). The original parent query block 502 also includes predicates P0(A) ˆP1(SV). Pruning predicates may be identified and pushed down appropriately. A modified parent query block 506 is shown. The modified parent query block includes Table A an inner SV query block 508. The inner SV query block 508 includes Tables B and C and decouples the predicates so that it includes predicates P(B) and P(C) and identified pruning predicate P1BˆP1C. The original predicate of P0(A)ˆP1(SV) outside of the inner SV query block 508 remains.

A1c. Pruning Predicate Pushdown through Secure Projection. Similar to A1b (Pruning Pushdown through Secure View Query Blocks), this pruning predicate approach involves, during Query Optimization, choosing to pushdown error-producing predicates through Secure Projection operators for pruning purposes. After applying rewrite rules, if the pruning predicates land on top of table scans, the system can further prune the scanset with these pruning predicates. The implementation of this is similar to A1b (Pruning Pushdown through Secure View Query Blocks), where original predicates would be retained on top of the Secure Projection, and a pruning-only predicate is pushed through. After the predicate lands on top of the TableScan, it is evaluated/pruned, after which the predicate would be removed. Repeated pushdowns can be avoided by marking predicates that have already occurred.

Figure 6:
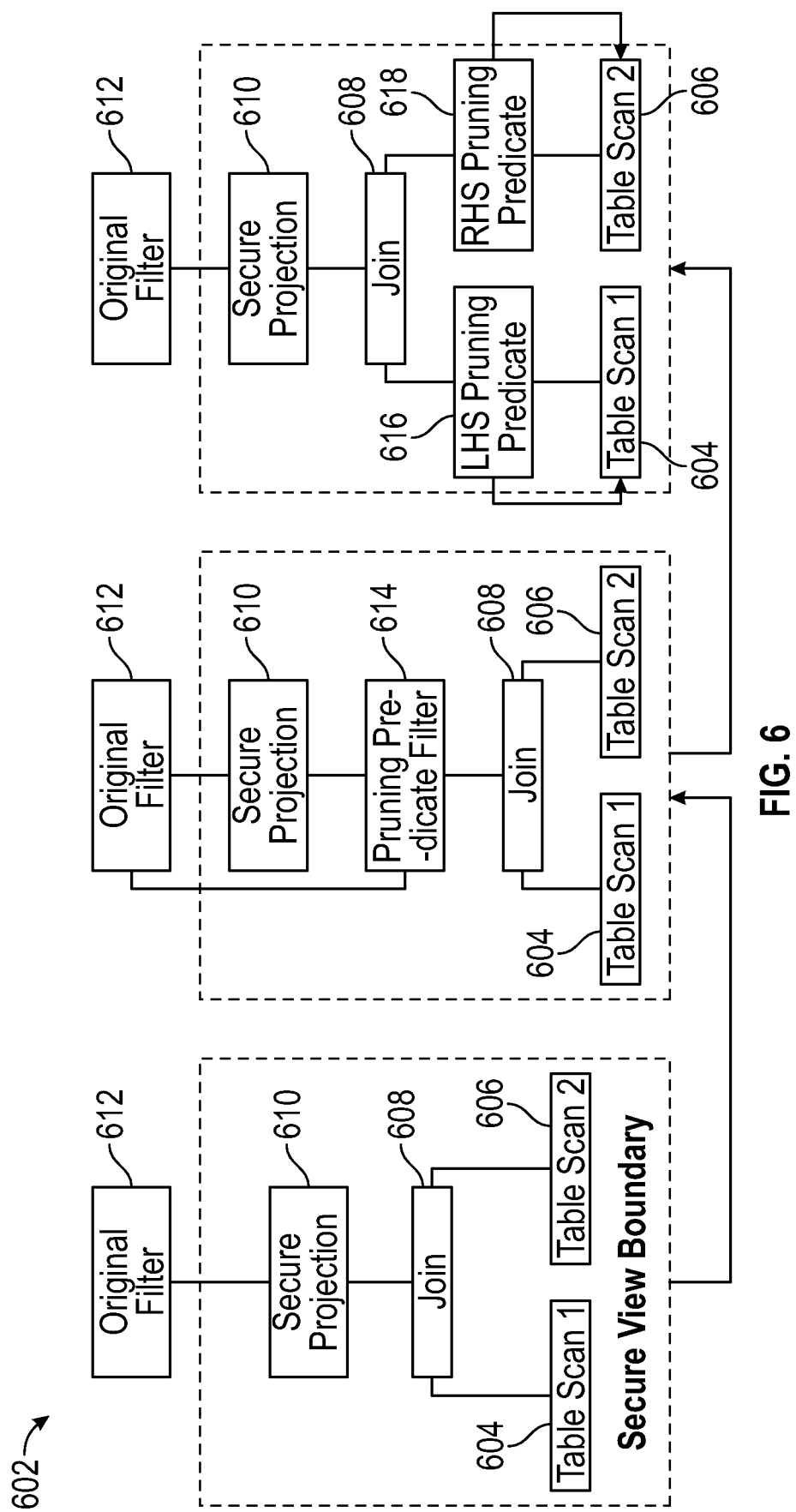
FIG. 6 illustrates a process for pruning predicate pushdown through secure projection, according to some embodiments.

FIG. 6 illustrates an example of pruning predicate pushdown through secure projection. An original secure view plan 602 is shown with a secure view boundary. The components in plan 602 that are within the secure view boundary include a table scan 1 604, a table scan 2 606, a join 608, and a secure projection 610. An original filter 612 is included outside of the secure view boundary. A pruning predicate may be generated. For example, a pruning predicate may be extracted from the original filter 612. A pruning predicate filter 614 can be then added and pushed through the secure projection 610 within the secure view boundary. The pruning predicate may then be pushed down into the respective table scans 604, 606. For example, a left pruning predicate 616 may be added for tablescan 1 604 and a right pruning predicate 618 may be added for table scan 606. The base tables (tables 1 and 2) may be pruned based on the pushdown pruning predicate. After pruning is completed, the pruning predicate may be removed from the secure view plan.

A2a. Secure Predicate Pullup. Conventional secure projections typically not only prevent predicate pushdown optimizations, but they can also similarly block predicate pullup optimizations. This in turn prevents many subsequent optimizations, such as transitive join predicate generation and could result in significant performance disadvantages.

To ensure the security of the transformation, during a Predicate Pull Up phase, an original predicate remains in place inside "Under" the Secure Projection to ensure the semantics of the Secure View stays the same. After this phase, an additional pulled-up predicate can be added on top of Secure Projection for subsequent rewrites to be applied.

Figure 7:
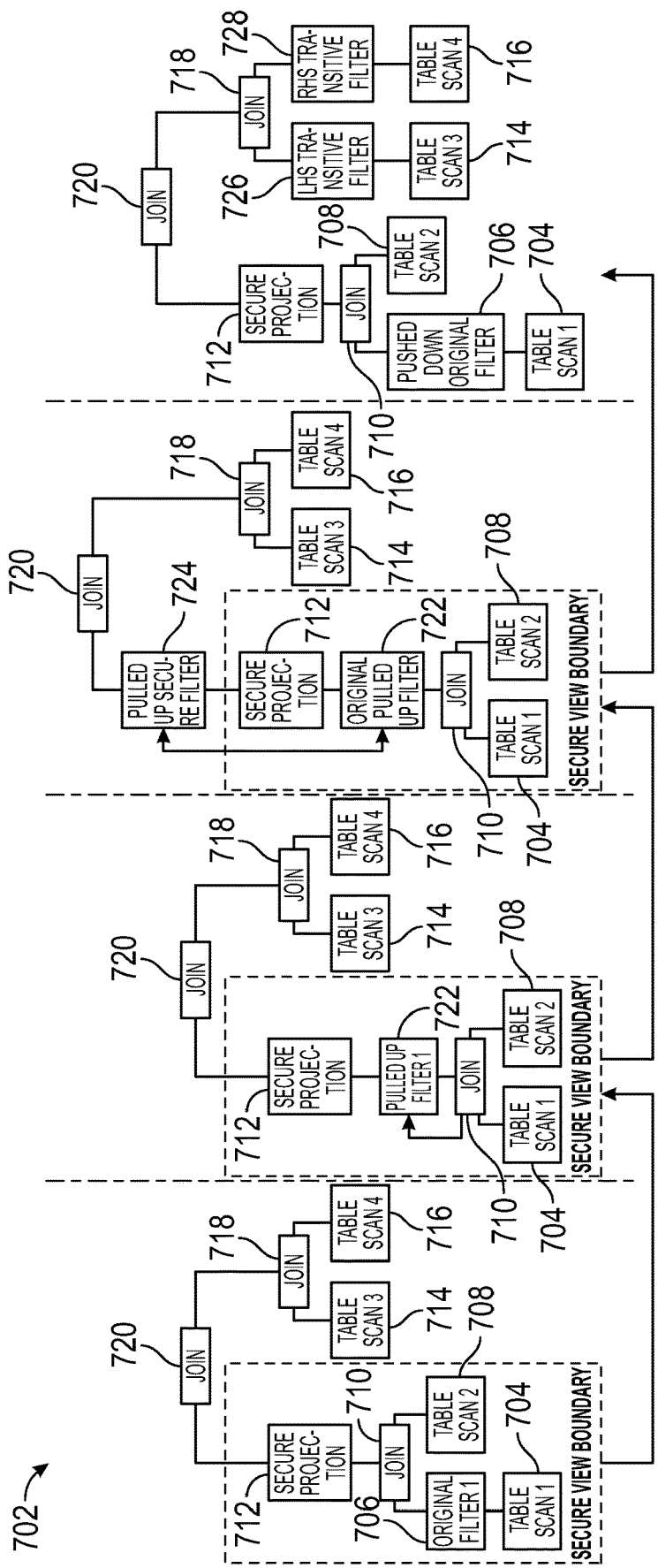
FIG. 7 illustrates a process for secure predicate pull up, according to some embodiments.

Since the Predicate Pull-Up phase happens before Predicate Pushdown phases, for error-producing predicates there is a chance that a duplicate filter would be stuck on top of the Secure Projection during the Pushdown phase. Special treatments can be used to recognize such cases, and these predicates can be removed upon landing on top of the Secure Projection again to avoid duplicate evaluation. FIG. 7 illustrates an example of a secure predicate pull up. An original secure view plan 702 is shown. The components in plan 702 that are within the secure view boundary include a table scan 1 704, an original filter 1 706, a table scan 2 708, a join 710, and a secure projection 712. The plan 702 may also include a table scan 3 714, a table scan 4 716, and a join 718. The plan 702 may also include a join 720 to join the results of the secure view (join of scanning tables 1 and 2 with the original filter) and join 718 (join of scanning tables 3 and 4).

The original filter 1 706 may be identified as a predicate to pull up to below the secure projection 712 as pulled up filter 1 722. Next, the predicate pullup secure filter can be pulled up above the secure projection 712 as pulled up secure filter 724 while retaining the pulled up filter 1 722 within the secure view boundary. Further predicate move arounds and optimizations may be applied now. For example, transitive predicate generation may be applied, which adds left transitive filter 726 and right transitive filter 728 for table scan 3 714 and table scan 4 716, respectively. After applying these optimizations and transformations, the pulled up secure filter 724 may be pushed back down to the original filter 1 706.

A2b. Null-Filtering Property Pushdowns. This null-filtering push down approach involves pushing down null-filtering properties through Secure Projections so that they can be checked for Outer Join to Inner-Join conversions leveraging null-filtering properties of predicates. Compared to Inner Joins, which only need to produce rows from matching keys, Outer Joins are obligated to produce rows that are referred to as null-extended sides even when there are no matching keys. Hence, Outer Joins are generally more expensive to evaluate compared to Inner Joins during execution, and converting from Outer Joins to Inner Joins using the same join keys can help improve query execution performance.

Figure 8:
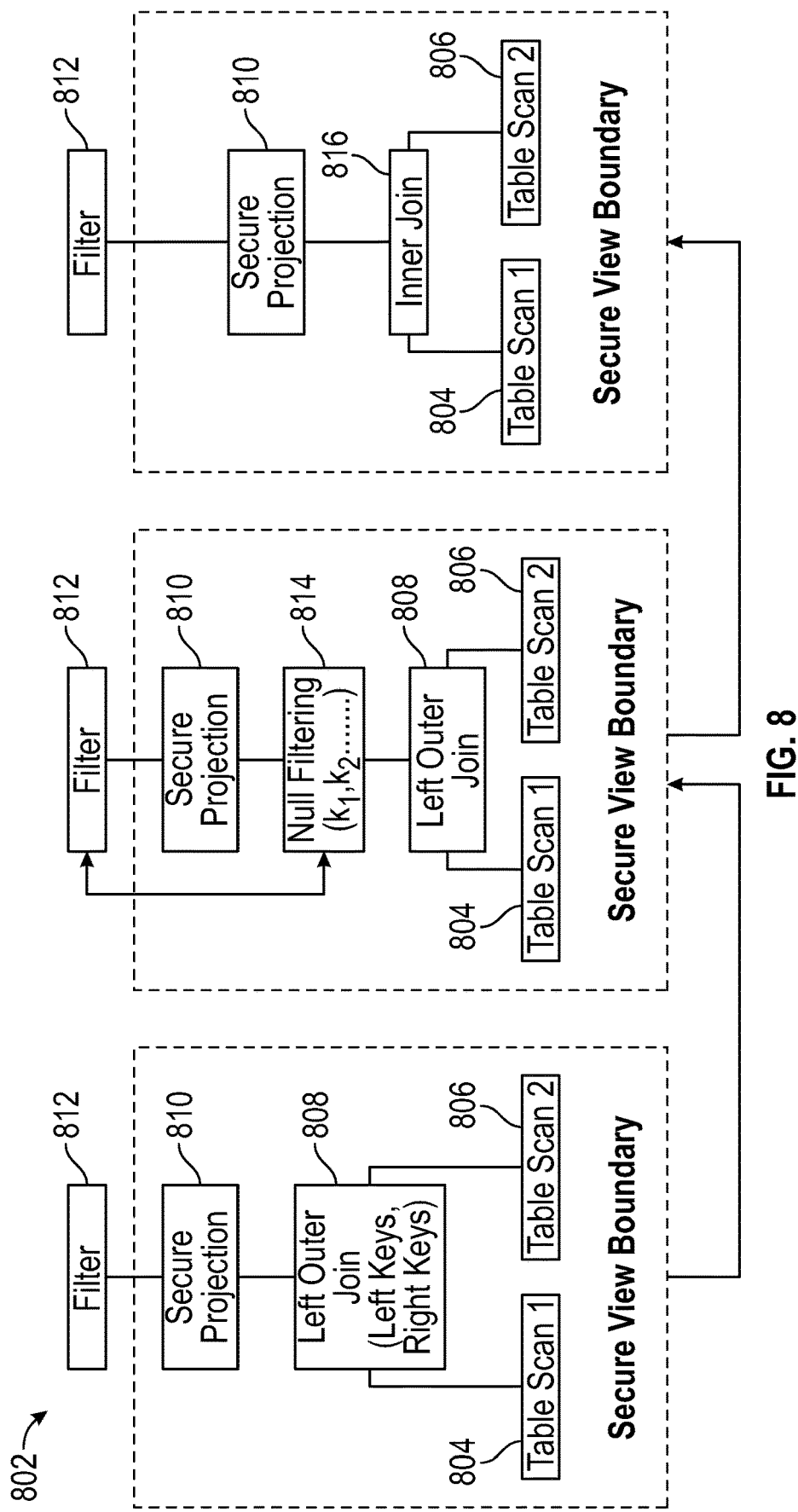
FIG. 8 illustrates a process for null-filtering property pushdowns, according to some example embodiments.

FIG. 8 illustrates an example of null-filtering property pushdowns. An original secure view plan 802 is shown with a secure view boundary. The components in plan 802 that are within the secure view boundary include a table scan 1 804, a table scan 2 806, a left outer join 808, and a secure projection 810. A filter 812 is included outside of the secure view boundary. Null-filtering property from the filter 812 may be pushed down below to secure projection 810 to within the secure view boundary to generate null filtering 814 (k1, k2, . . . ). With the null-filtering within the secure view boundary, the left outer join 808 may be converted to an inner 816.

Next, techniques for dedicated performance optimizations for secure views/functions are described.

B1a. Online Conversion of Secure Objects to Non-Secure Objects. This conversion approach checks for whether the system can treat Secure Objects as Non-Secure Objects during processing of a single query. This would be possible if the current role has direct access to all objects referenced in the secure view/secure function. This can be checked early on during name resolution at the view/UDF Expansion stage, and when this case is detected, the system can expand these objects as regular view/functions, and no further changes are performed for the subsequent steps of the optimization. This conversion can ensure that all performance optimizations for regular view/functions would also apply.

Since the system loads all the relevant objects during View or UDF expansions to check access privileges against the ownership role of the View/UDF, for this optimization the system identifies that it is expanding a secure object, pass in the parent compiling role, and check these object against both the compiling role and the owner role of the view/function.

B2a. Safe Filter Generation. When dealing with the issue of pushing error-producing predicates through Secure Projections, "safe" filters can be generated that are designed to not produce errors during execution. The filters are annotated with a special flag in the execution plan produced by the compiler, which indicates to the XP that upon detecting an error during evaluation of the filter, the filter can be skipped (regarded as if that filter does not exist). Instead of failing the execution of the query that might lead to potential data leakage, safe filters simply skip applying the filter logic for the error-producing rows in the predicate. This rewrite is semantically equivalent since the original predicate is still evaluated outside the boundary of the secure view. In the normal case, the majority of the rows in a secure view are non-error producing, hence they can be eliminated early by the safe filter and reduce the execution time overhead for evaluating these rows in the rest of the query plan.

This safe-filter approach can be applicable to rewrite rules that push or pull filters through Secure Projections, and it could also be applicable to other similar cases where maintaining the error semantics would be useful.

Figure 9:
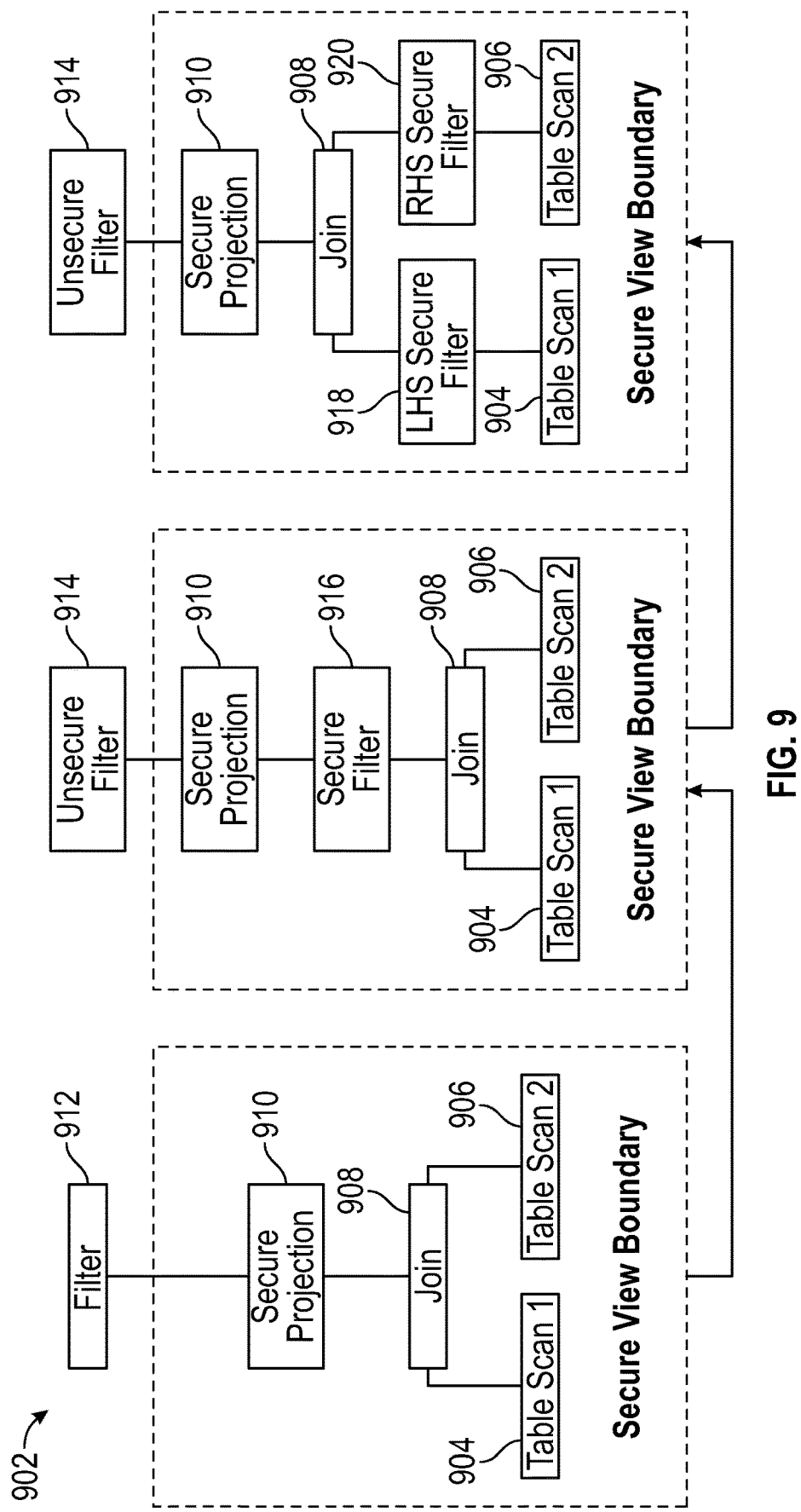
FIG. 9 illustrates a process for generating safe filters, according to some example embodiments.

FIG. 9 illustrates an example for generating safe filters. An original secure view plan 902 is shown with a secure view boundary. The components in plan 902 that are within the secure view boundary include a table scan 1 904, a table scan 2 906, a join 908, and a secure projection 910. A filter 912 is included outside of the secure view boundary. The filter 912 may be split into unsecure (or unsafe) filter and secure (or safe) filter properties. The filter 912 on top of the secure projection 910 may be replaced by an unsecure filter 914 and a secure filter 916 may be pushed down below the secure projection 910 to within the secure view boundary. The secure filter 916 may then be pushed further down to below join 908 to generate a left secure filter 918 for table scan 1 904 and right secure filter 920 for table scan 2 906.

B2b. Order Preserving Predicate Movearound. Even if a predicate defined on top of a Secure View could produce errors, it would still be satisfactory to push it through the Secure Projection as long as the system can ensure that this predicate will be evaluated after the predicates defined within the Secure View. In other words, as long as the system guarantees that predicates defined within the Secure View will be evaluated first, any predicates can be pushed through the Secure Projection.

Guaranteeing the ordering of predicates that are moved around during query optimization can be complex. However, for certain scenarios of Secure views this can be tractable because these predicates are not moved up beyond the boundaries of the Secure Projection. As a result, during Predicate Pushdown, the system can identify that the ordering of the predicates are still intact, that the predicates which appear first (closer to the leaves) of the plan tree should be evaluated first. With this information, the system can ensure that Predicate Pushdown rules respect the ordering of such predicates and make sure that they are evaluated first during execution.

The optimization techniques described herein can be used in combination with each other. A system can implement one or more of the optimization techniques in combination. For example, a system can implement (A1b) Pruning Pushdown through Secure View Query Blocks and (A1c) Pruning Predicate Pushdown through Secure Projection. That system may also implement (B2a) Safe Filter Generation, (A2a) Secure Predicate Pullup, and (B1a) Online Conversion of Secure Objects to Non-Secure Objects.

Figure 10:
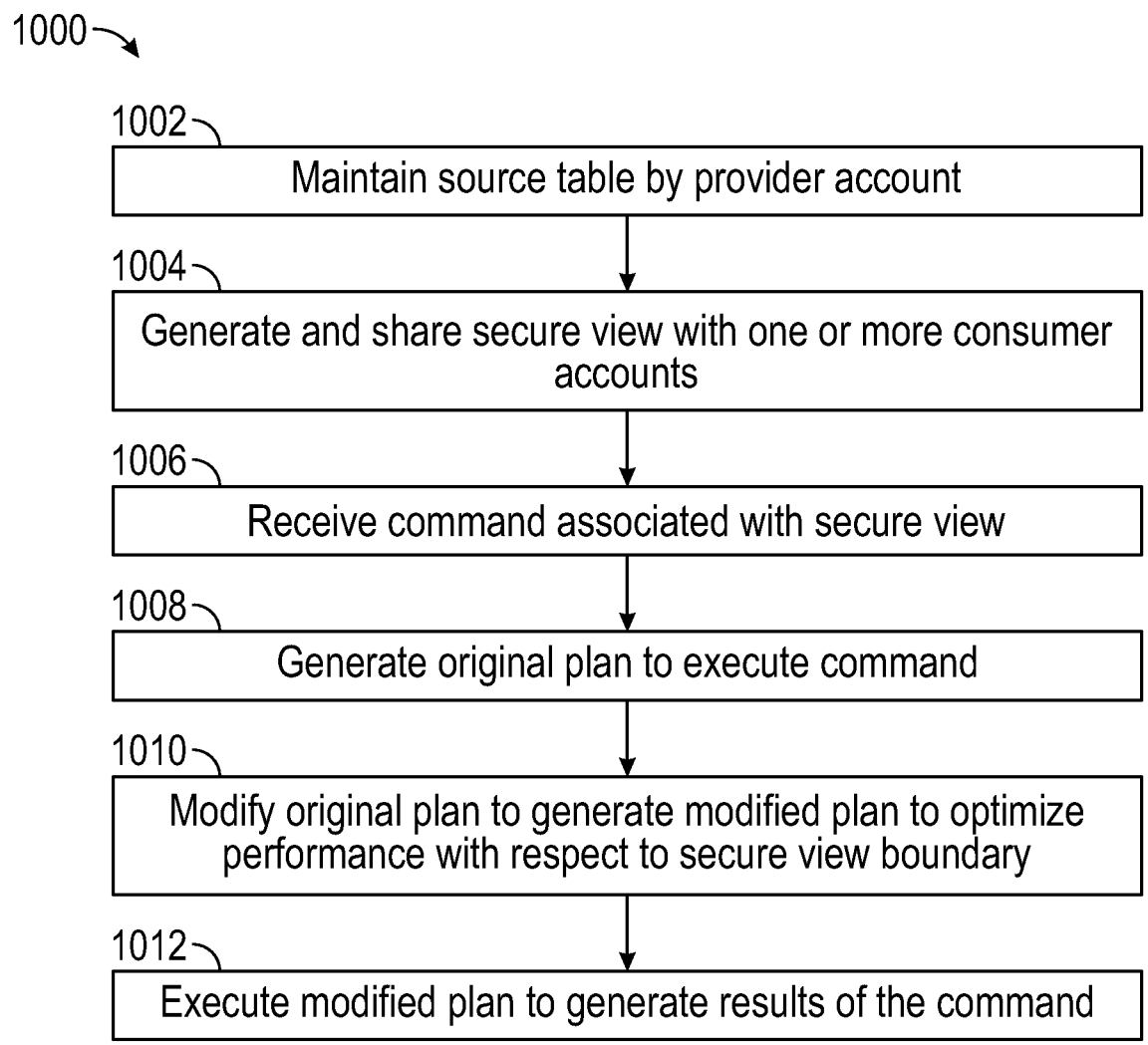
FIG. 10 shows a flow diagram of method for optimizing performance of a secure view, according to some example embodiments

FIG. 10 shows a flow diagram of method 1000 for optimizing performance of a secure view, according to some example embodiments. At operation 1002, one or more source tables may be maintained in a data system, as described herein. The source table(s) may belong to a provider account. At operation 1004, a secure view of the source table (or of a plurality of source tables) may be generated and shared with one or more consumer accounts by the provider account. As described herein, the secure view may provide limited access to a subset of data in the source table(s) to the one or more consumer accounts.

At operation 1006, a command may be received. The command may be received from the one or more consumer accounts. The command may be associated with the secure view. The command, for example, may be a query or a show command. At operation 1008, an original plan (e.g., parse tree representation) may be generated using the secure view to execute the command. The original plan may include a secure view boundary where a subset of operations are provided within the secure view boundary, as described herein.

At operation 1010, the original plan may be modified one or more times to optimize performance with respect to the secure view boundary to generate a modified plan. The original plan may be modified to make modifications to rewrites, as described above. (e.g., Secure Predicate Pushdown, Pruning Pushdown through Secure View Query Blocks, Pruning Predicate Pushdown through Secure Projection, Secure Predicate Pullup, Null-Filtering Property Pushdowns). For example, one or more operations that were not within the secure view boundary may be moved within the secure view boundary, as described herein. For example, one or more operations that were within the secure view boundary may be moved outside of the secure view boundary, as described herein.

The original plan may also be modified to perform further optimizations to implement secure views/functions, as described herein (e.g., Online Conversion of Secure Objects to Non-Secure Objects, Safe Filter Generation, Order Preserving Predicate Movearound). At operation 1012, the modified plan may be executed to generate results of the command.

Figure 11:
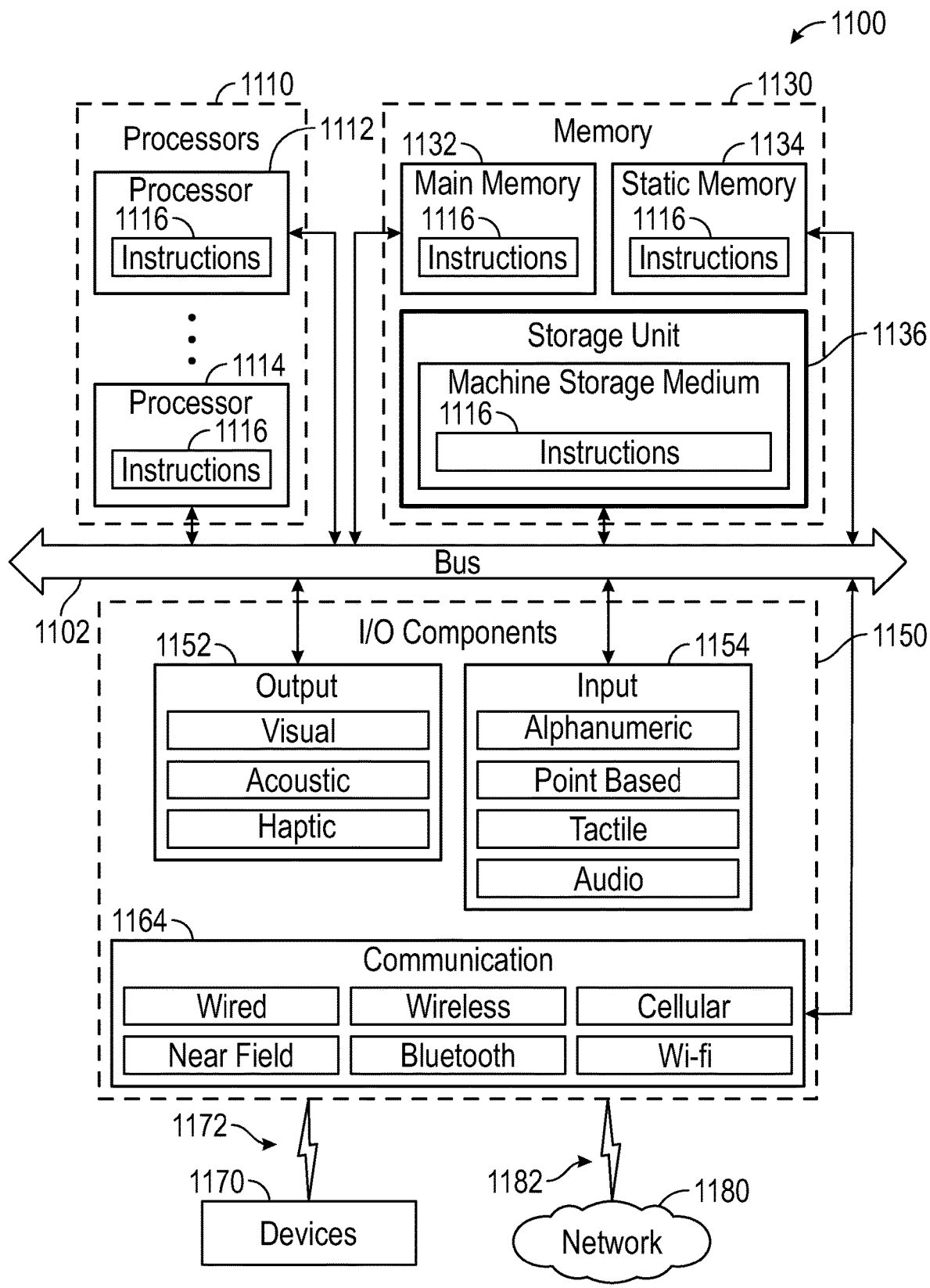
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described herein. As another example, the instructions 1116 may cause the machine 1100 to implement portions of the data flows described herein. In this way, the instructions 1116 transform a general, non-programmed machine into a particular machine 1100 (e.g., the remote computing device 106, the access management system 118, the compute service manager 112, the execution platform 114, the access management system 118, the Web proxy 120) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the remote computing devices 106, the access management system 118, the compute service manager 112, the execution platform 114, the Web proxy 120, and the devices 1170 may include any other of these systems and devices.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: maintaining a source table by a provider account in a network-based data system; providing a secure object of the source table to one or more consumer accounts, the secure object limiting access to a subset of data in the source table; receiving a command from the one or more consumer accounts; generating a first plan to execute the command using the secure object, the plan including a secure object boundary on a subset of operations defining the secure object; modifying the first plan to provide a first operation that was outside the secure object boundary to within the secure object boundary to generate a second plan; and executing the second plan to generate results of the command.

Example 2. The method of example 1, further comprising: splitting a filter operation outside of the secure object boundary in the first plan into one or more error-producing filter property and one or more non-error producing filtering property; and inserting the non-error producing filter property within the secure object boundary as the first operation in the second plan.

Example 3. The method of any of examples 1-2, further comprising: pushing down the first operation below a join operation in the second plan.

Example 4. The method of any of examples 1-3, wherein the first operation is a pruning predicate.

Example 5. The method of any of examples 1-4, further comprising: performing the predicate pruning filter operation on the source table; and in response to performing the predicate pruning filter operation, removing the predicate pruning filter operation from the second plan.

Example 6. The method of any of examples 1-5, further comprising: moving a predicate pull up from within the secure object boundary to outside the secure object boundary.

Example 7. The method of any of examples 1-6, wherein the first operation is a null filtering operation.

Example 8. The method of any of examples 1-7, further comprising: converting an outer join within the secure object boundary to an inner join within the secure object boundary based on moving the null filtering operation to within the secure object boundary.

Example 9. The method of any of examples 1-8, further comprising: splitting a filter operation outside of the secure object boundary in the first plan into an unsecure filter operation and secure filter operation; and inserting the secure filter operation within the secure object boundary as the first operation in the second plan.

Example 10. The method of any of examples 1-9, further comprising: pushing down the first operation below a join operation in the second plan.

Example 11. A system comprising: one or more processors of a machine; and a memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

What is claimed is:

1. A method comprising:
maintaining a source table by a provider account in a network-based data system;
providing a secure object of the source table to one or more consumer accounts, the secure object limiting access to a subset of data in the source table;
receiving a command from the one or more consumer accounts;
generating a first plan to execute the command using the secure object, the first plan including a secure object boundary on a subset of operations defining the secure object, the first plan including a filter operation outside the secure object boundary;
modifying the first plan to provide a first operation that was outside the secure object boundary to within the secure object boundary to generate a second plan, the modifying comprising:
extracting a pruning predicate from the filter operation outside the secure object boundary,
adding a first pruning predicate filter operation based on the extracted pruning predicate to within the secure object boundary,
pushing down the first pruning predicate filter operation by converting the first pruning predicate filter to a second pruning predicate filter operation on top of a first table scan operation and a third pruning predicate filter operation on top of a second table scan operation, evaluating the second pruning predicate filter operation and the third pruning predicate filter operation within the secure object boundary, and removing the pruning predicate based on evaluating the second pruning predicate filter operation and the third pruning predicate filter operation within the secure object boundary; and executing the second plan to generate results of the command.

2. The method of claim 1, further comprising:
splitting a filter operation outside of the secure object boundary in the first plan into one or more error-producing filter property and one or more non-error producing filtering property; and inserting the non-error producing filter property within the secure object boundary as the first operation in the second plan.

3. The method of claim 2, further comprising:
pushing down the first operation below a join operation in the second plan.

4. The method of claim 1, further comprising:
moving a predicate pull up from within the secure object boundary to outside the secure object boundary.

5. The method of claim 1, wherein the first operation is a null filtering operation.

6. The method of claim 5, further comprising:
converting an outer join within the secure object boundary to an inner join within the secure object boundary based on moving the null filtering operation to within the secure object boundary.

7. The method of claim 1, further comprising:
splitting a filter operation outside of the secure object boundary in the first plan into an unsecure filter operation and secure filter operation; and inserting the secure filter operation within the secure object boundary as the first operation in the second plan.

8. The method of claim 7, further comprising:
pushing down the first operation below a join operation in the second plan.

9. A machine-storage medium embodying instructions that, when executed by a machine, cause the machine to perform operations comprising:

maintaining a source table by a provider account in a network-based data system;

providing a secure object of the source table to one or more consumer accounts, the secure object limiting access to a subset of data in the source table;

receiving a command from the one or more consumer accounts;

generating a first plan to execute the command using the secure object, the first plan including a secure object boundary on a subset of operations defining the secure object, the first plan including a filter operation outside the secure object boundary;

modifying the first plan to provide a first operation that was outside the secure object boundary to within the secure object boundary to generate a second plan, the modifying comprising:

extracting a pruning predicate from the filter operation outside the secure object boundary, adding a first pruning predicate filter operation based on the extracted pruning predicate to within the secure object boundary, pushing down the first pruning predicate filter operation by converting the first pruning predicate filter to a second pruning predicate filter operation on top of a first table scan operation and a third pruning predicate filter operation on top of a second table scan operation, evaluating the second pruning predicate filter operation and the third pruning predicate filter operation within the secure object boundary, and removing the pruning predicate based on evaluating the second pruning predicate filter operation and the third pruning predicate filter operation within the secure object boundary; and executing the second plan to generate results of the command.

10. The machine-storage medium of claim 9, further comprising:
splitting a filter operation outside of the secure object boundary in the first plan into one or more error-producing filter property and one or more non-error producing filtering property; and inserting the non-error producing filter property within the secure object boundary as the first operation in the second plan.

11. The machine-storage medium of claim 10, further comprising:
pushing down the first operation below a join operation in the second plan.

12. The machine-storage medium of claim 9, further comprising:
moving a predicate pull up from within the secure object boundary to outside the secure object boundary.

13. The machine-storage medium of claim 9, wherein the first operation is a null filtering operation.

14. The machine-storage medium of claim 13, further comprising:
converting an outer join within the secure object boundary to an inner join within the secure object boundary based on moving the null filtering operation to within the secure object boundary.

15. The machine-storage medium of claim 9, further comprising:
splitting a filter operation outside of the secure object boundary in the first plan into an unsecure filter operation and secure filter operation; and inserting the secure filter operation within the secure object boundary as the first operation in the second plan.

16. The machine-storage medium of claim 15, further comprising:
pushing down the first operation below a join operation in the second plan.

17. A system comprising:
at least one hardware processor; and
at least one memory storing instructions that, when executed by the at least one hardware processor, cause the at least one hardware processor to perform operations comprising:

maintaining a source table by a provider account in a network-based data system;

providing a secure object of the source table to one or more consumer accounts, the secure object limiting access to a subset of data in the source table;

receiving a command from the one or more consumer accounts;

generating a first plan to execute the command using the secure object, the first plan including a secure object boundary on a subset of operations defining the secure object, the first plan including a filter operation outside the secure object boundary;

modifying the first plan to provide a first operation that was outside the secure object boundary to within the secure object boundary to generate a second plan, the modifying comprising:

extracting a pruning predicate from the filter operation outside the secure object boundary, adding a first pruning predicate filter operation based on the extracted pruning predicate to within the secure object boundary, pushing down the first pruning predicate filter operation by converting the first pruning predicate filter to a second pruning predicate filter operation on top of a first table scan operation and a third pruning predicate filter operation on top of a second table scan operation, evaluating the second pruning predicate filter operation and the third pruning predicate filter operation within the secure object boundary, and removing the pruning predicate based on evaluating the second pruning predicate filter operation and the third pruning predicate filter operation within the secure object boundary; and executing the second plan to generate results of the command.

18. The system of claim 17, the operations further comprising:

splitting a filter operation outside of the secure object boundary in the first plan into one or more error-producing filter property and one or more non-error producing filtering property; and inserting the non-error producing filter property within the secure object boundary as the first operation in the second plan.

19. The system of claim 18, the operations further comprising:

pushing down the first operation below a join operation in the second plan.

20. The system of claim 17, the operations further comprising:

moving a predicate pull up from within the secure object boundary to outside the secure object boundary.

21. The system of claim 17, wherein the first operation is a null filtering operation.

22. The system of claim 21, the operations further comprising:

converting an outer join within the secure object boundary to an inner join within the secure object boundary based on moving the null filtering operation to within the secure object boundary.

23. The system of claim 17, the operations further comprising:

splitting a filter operation outside of the secure object boundary in the first plan into an unsecure filter operation and secure filter operation; and inserting the secure filter operation within the secure object boundary as the first operation in the second plan.

24. The system of claim 23, the operations further comprising:

pushing down the first operation below a join operation in the second plan.

* * * * *